UNITED STATES PATENT OFFICE.

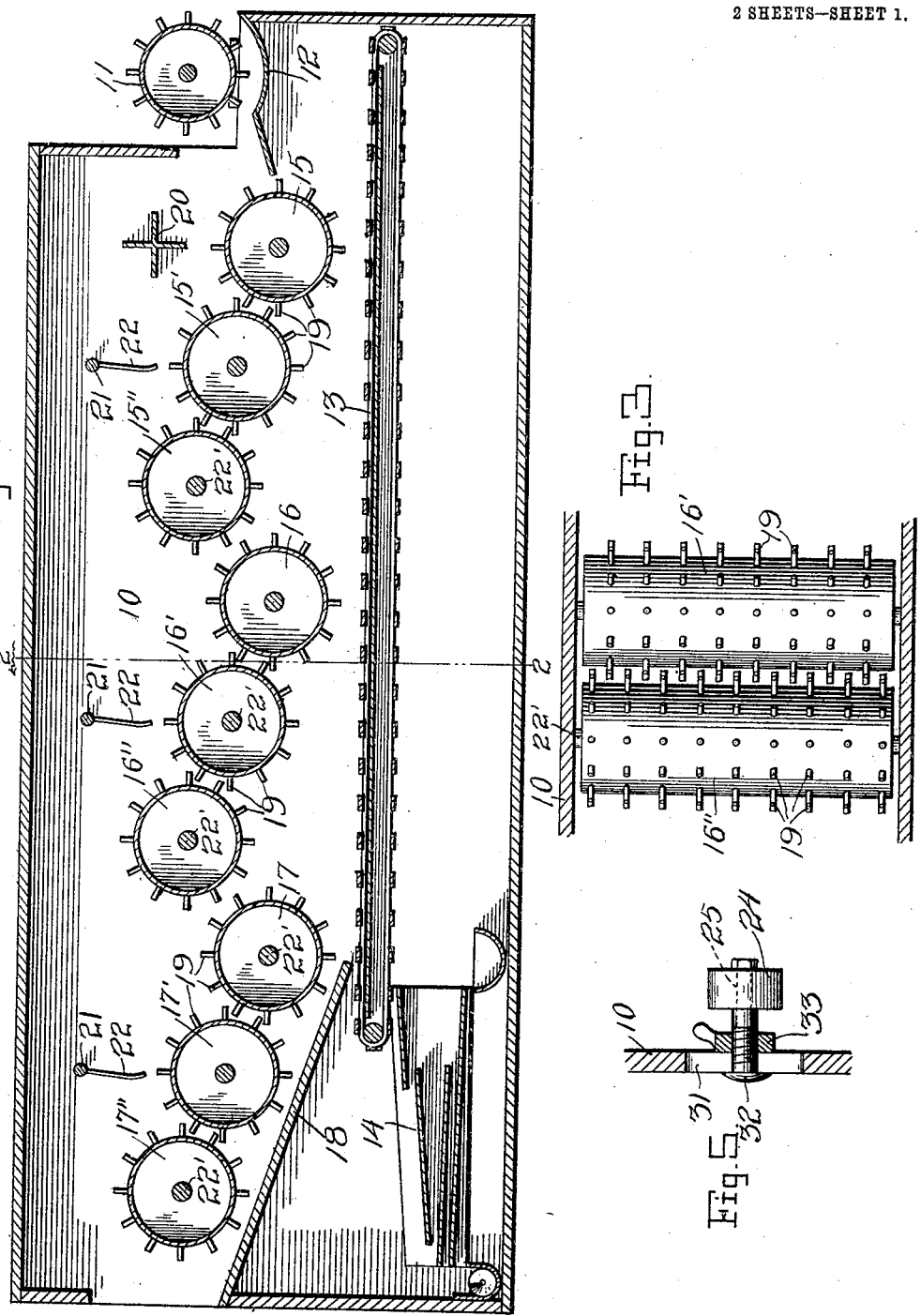

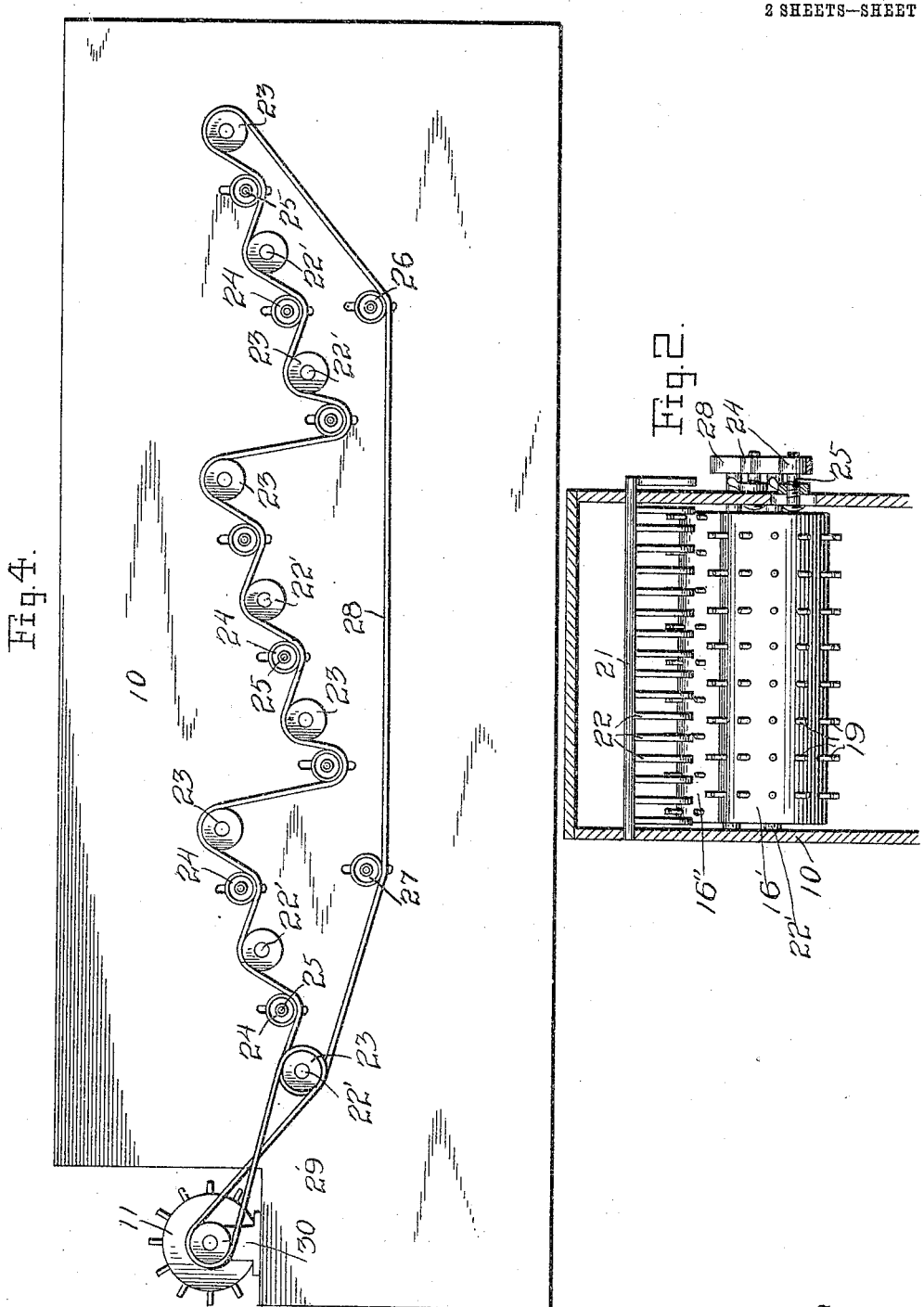

JOHN E. HUMPHREY, OF GILTNER, NEBRASKA.

STRAW-CONVEYER FOR THRESHING-MACHINES.

No. 806,671.   Specification of Letters Patent.   Patented Dec. 5, 1905.

Application filed March 30, 1904. Serial No. 200,856.

*To all whom it may concern:*

Be it known that I, JOHN E. HUMPHREY, a citizen of the United States, residing at Giltner, in the county of Hamilton, State of Nebraska, have invented certain new and useful Improvements in Straw-Conveyers for Threshing-Machines; and I do hereby declare the following to be a full, clear, and exact description of the invention, such as will enable others skilled in the art to which it appertains to make and use the same.

This invention relates to threshing-machines, and more particularly to straw-conveyers therefor, the object of the invention being to provide a conveyer for carrying the straw from the threshing-cylinder and concave through the machine to the discharge end thereof without the ordinary objectionable vibration and at the same time to carry the straw through the machine in a layer of comparatively uniform thickness or within a limit of thickness, so that the threshing will be efficient.

Other objects and advantages of the invention will be understood from the following description.

In the drawings forming a portion of this specification, and in which like numerals of reference indicate similar parts in the several views, Figure 1 is a section taken longitudinally through a threshing-machine embodying the present invention. Fig. 2 is a section on line 2 2 of Fig. 1, showing the arrangement of a distributing-fork with respect to one of the drums. Fig. 3 is a plan view showing a pair of the conveying drums or rollers with their teeth intermeshing. Fig. 4 is a view showing the arrangement of belting for driving the drums. Fig. 5 is a detail view, partly in section and partly in elevation, showing one of the adjustable idlers.

Referring now to the drawings, there is shown a portion of a threshing-machine comprising a casing 10, at one end of which there is mounted the usual threshing-cylinder 11, which operates in connection with a concave 12, the straw to be threshed being fed between the cylinder and the concave in the usual manner and the grain falling from the inner end of the concave onto a conveyer 13, by which it is carried to a cleaning-shoe 14 of common construction.

It will be understood that the specific form of conveyer and cleaning-shoe may be modified as desired, as they form no part of the present invention.

In the casing 10, between the concave and the discharge end of the casing, are arranged drums arranged in series of three, which series are inclined rearwardly of the casing. The drums nearest to the concave are indicated by the reference-numerals 15, 15', and 15", the drums of the second series are indicated by 16, 16', and 16", and the drums of the third series by 17, 17', and 17". The drums 15, 16, and 17 are in the same horizontal plane, the drums 15', 16', and 17' are in the same horizontal plane, and the drums 15", 16", and 17" are in the same horizontal plane, the drum 15" being above and having a common vertical tangent with the drum 16, while the drum 16" is above and has a common vertical tangent with the drum 17, the drums 15" and 16 lying at opposite sides of said vertical tangent and the drums 16" and 17 lying at opposite sides of their common vertical tangent.

The drum 15 is spaced sufficiently far from the concave 12 to permit of grain falling from the edge of the concave clear of the drum 15 and onto the conveyer therebelow, the straw passing from the concave to the drum 15 and thence upwardly over the drums 15' and 15", then downwardly to the drum 16, then upwardly over the second series of drums, then downwardly to the third series of drums, and then upwardly to the discharge end of the machine. In this movement of the straw the loose grain is shaken out of the straw and passes downwardly between the drums to the conveyer, which extends beneath the first and second series of drums. There is an inclined chute 18 beneath the third series of drums, which leads downwardly to the conveyer, so that the grain that falls from the third series of drums passes down the chute to the conveyer.

To insure movement of the straw with the drums as the latter are rotated, they are provided with teeth 19, which radiate therefrom in longitudinal series, the drums of each series being arranged in such close relation that the teeth of one drum will pass between the teeth of the next drum, the upwardly-moving teeth at the side of each drum next to the concave or in the direction of the concave serving to raise the straw that may fall thereon or be carried downwardly by the teeth of the preceding drum of the series.

Above the drum 15 is arranged a common form of beater 20, and above the intermediate drum of each series is arranged a fork comprising a cross-bar 21, from which extend downwardly straw-deflecting teeth 22, which are spaced slightly apart, each of the teeth consisting of a spring-wire having its lower end curved in a direction opposite to that of rotation of the upper side of the drum, the teeth or fingers 22 being inclined also rearwardly of the direction of rotation of the upper side of the drum, as illustrated. The teeth or fingers 22 extend downwardly so far as to permit only a thin layer of straw to pass beneath them and the rollers therebelow, and they serve to break up large masses of straw in which free grain may be carried.

To rotate the conveyer-drums simultaneously in the same direction, the shaft 22 of each drum is provided with a pulley-wheel 23, and between each pair of pulleys 23 is arranged an idler 24, the idlers between the adjacent end pulleys of each series being carried by stub-shafts 25, which are adjustable vertically. Additional idlers 26 and 27 are provided below the idlers 24, and a driving-belt 28 is arranged in zigzag relation to the pulleys 23 and 24 and then passes downwardly around and beneath the pulleys 26 and 27, so that the entire series of drums is rotated, and by adjusting the idlers 24, with their stub-shafts, vertically the tension of the driving-belt may be varied. The pulley 23 of the drum 15 is made sufficiently long to receive a belt 29 from the pulley 30 on the shaft of the threshing-cylinder.

The stub-shafts 25 may be arranged for vertical adjustment in any suitable manner, there being illustrated in Fig. 5 a stub-shaft mounted in a slot 31 in the side of the casing 10 and having a head 32, which holds the shaft against withdrawal outwardly against the slot. The shaft is of increased diameter adjacent to the head, and this portion is threaded and has engaged therewith a hand-nut 33, which by impingement against the casing holds the shaft in fixed position.

It will be understood that in practice modifications of the specific construction shown may be made and any suitable materials and proportions may be used for the various parts without departing from the spirit of the invention.

What is claimed is—

In a threshing-machine, the combination with the threshing-cylinder and its concave, of a straw-carrier comprising inclined series of drums provided each with a driving-pulley, idler-pulleys alternately with the drums of each series, the idler-pulleys between the end drums of each series being adjustable at right angles to their axes, a pair of pulleys arranged in alinement beneath the pulleys and idlers, the pair of pulleys being adjustable at right angles to their axes, a driving-belt engaged with the first-mentioned pulleys successively in zigzag relation thereto and passed around the said pair of pulleys, pivoted straw-deflectors arranged in alinement and depending above certain of the drums with their lower ends in close proximity to the cutter and connections between a drum and the threshing-cylinder for rotating the drum.

In testimony whereof I affix my signature in presence of two witnesses.

JOHN E. HUMPHREY.

Witnesses:
M. A. SIREN,
W. R. HUMPHREY.